United States Patent [19]

Kuramochi et al.

[11] Patent Number: 4,756,948
[45] Date of Patent: Jul. 12, 1988

[54] CORE MATERIAL FOR AUTOMOBILE BUMPERS

[75] Inventors: Hiroyuki Kuramochi, Hiratsuka; Hiroki Kuranari, Ichikawa; Toru Yamaguchi, Utsunomiya; Hisao Tetsuka, Tochigi; Hideto Nakatsuka, Isehara; Shingo Takahashi, Utsunomiya, all of Japan

[73] Assignee: Japan Styrene Paper Corporation, Tokyo, Japan

[21] Appl. No.: 75,978

[22] Filed: Jul. 21, 1987

[30] Foreign Application Priority Data

Jul. 22, 1986 [JP] Japan .................. 61-113174[U]
Jan. 21, 1987 [JP] Japan ................... 62-7280[U]

[51] Int. Cl.$^4$ ............................................... B32B 3/30
[52] U.S. Cl. ...................................... 428/167; 428/31; 428/173
[58] Field of Search ................ 428/31, 71, 76, 167, 428/173

[56] References Cited

U.S. PATENT DOCUMENTS

| | | | |
|---|---|---|---|
| 4,504,534 | 3/1985 | Adachi et al. | 428/71 |
| 4,565,723 | 1/1986 | Hirsch | 428/71 |
| 4,598,001 | 7/1986 | Watanabe et al. | 428/31 |
| 4,600,636 | 7/1986 | Yoshimura et al. | 428/71 |

FOREIGN PATENT DOCUMENTS 936232 9/1963 United Kingdom ................ 428/167

Primary Examiner—William J. Van Balen
Attorney, Agent, or Firm—Stephen F. K. Yee

[57] ABSTRACT

A core material for an automobile bumper is disclosed, which includes an elongated body of a foamed polyolefin resin provided with a plurality of depressed portions in front and/or rear surfaces thereof, and structural members disposed within at least part of said depressed portions. The structural members are formed of a synthetic resin and have a bulk density of 0.2–3.5 g/cm$^3$.

12 Claims, 1 Drawing Sheet

CORE MATERIAL FOR AUTOMOBILE BUMPERS

This invention relates generally to an energy absorber bumper to be utilized on automobiles and, more specifically, a core material for such a bumper formed of a polyolefin foam.

There are known a variety of energy absorbing bumpers in which a foamed polymeric material is utilized as an energy-absorbing core material. Generally, the bumper includes a front cover serving as a front impact surface, a back beam serving as a rear mounting surface, and a foamed core disposed between the front cover and the back beam. Examples of such automobile bumpers are those disclosed in U.S. Pat. Nos. 4,504,534 and 4,600,636 owned by Japan Styrene Paper Corporation.

Conventional bumper cores are generally designed to withstand an impact of 2.5–5 mile/hr. In order to improve the energy absorbing power, it is unavoidable to use a core material of a higher density.

The present invention contemplates the provision of a bumper core material which is light in weight but which has excellent energy absorbing property.

In accordance with the present invention there is provided a core material for an automobile bumper, comprising:

an elongated body formed of a foamed polyolefin resin and having front and rear surfaces, said body being provided with a plurality of depressed portions in the front and/or rear surfaces thereof; and structural members formed of a synthetic resin and having a bulk density of 0.2–3.5 g/cm$^3$, said structural members being disposed in at least part of said depressed portions.

The present invention will now be described in detail below with reference to the accompanying drawings, in which.

Figure 1:
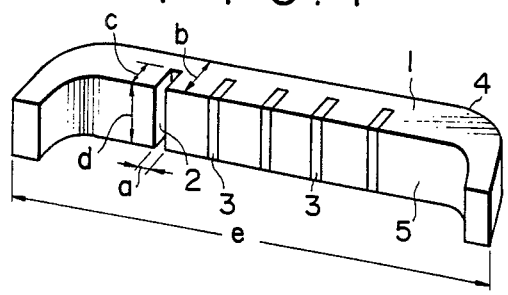
FIG. 1 is a perspective view diagrammatically showing one embodiment of an automobile bumper core material according to the present invention.

Referring now to FIG. 1, automobile bumper core material according to the present invention includes an elongated body 1 formed of a foamed polyolefin resin and having front and rear surfaces 4 and 5. In the front surface 4 and/or rear surface 5 (in the rear surface 5 in the illustrated specific embodiment) are provided a plurality (five in the illustrated case) of depressed portions 2. The number of the depressed portions 2 varies with the size of the elongated body 1 and the size of the depressed portions 2, but generally it is 1–100, preferably 2–50. The depressed portions are preferably arranged or distributed symmetrically in the axial direction.

The size or area of the opening of each depressed portion 2 ($a \times d$ in the illustrated case) is generally 0.5–200 cm$^2$, preferably 1–100 cm$^2$. The total area of the openings of the depressed portions ($5(a \times d)$ in the illustrated case) in the front surface 4 and/or rear surface 5 is desirably 1.5–100% of the projected area (($d \times e$) in the illustrated case) of the elongated body 1, the projection being in the direction from the front surface 4 to the rear surface 5 of the elongated body 1. When the depressed portions 2 are provided in either the front surface 4 or rear surace 5, the total area of the openings of the depressed portions 2 is desirably not greater than 70% of the projected area of the elongated body 1. The projected area of the elongated body 1 is generally in the range of 400–5000 cm$^2$. The depth (c in the illustrated case) of each of the depressed portions 2 is preferably 15–95% of the thickness (b in the illustrated case) of the elongated body 1.

The polyolefin resin to be used as the elongated body 1 may include, for example, polypropylene polymers such as polypropylene homopolymers, ethylene-propylene random copolymers and ethylene-propylene block copolymers, high density polyethylenes and high density polyethylenes modified with vinyl aromatic monomers. Above all, the use of the polypropylene copolymers is most preferred. The density (apparent density) of the elongated body 1 is generally 0.15–0.01 g/cm$^3$, preferably 0.1–0.015 g/cm$^3$.

Disposed within at least a part of the depressed portions 2 are structural members 3 formed of a synthetic resin and having a density of 0.2–3.5 g/cm$^3$. Both foamed or unfoamed resin may be used. Illustrative of suitable synthetic resin to be used as the structural members are polyolefin resins such as polypropylenes and polyethylenes, hard polyurethanes, polystyrenes, nylons, polycarbonates, polyethylene terephthalates and hard vinyl chloride resins. These resins may be used singly or as a mixture or as a composite of two or more.

If desired, a filler may be incorporated into the resin of which the structural members 3 are formed. Illustrative of suitable fillers are silica, mica, talc, clay, bentonite, graphite, carbon black, calcium carbonate, titanium oxide, alumina, iron powder, molybdenum disulfide, vanadium sulfide, polyacrylurea, cuprophthalocyanine, asbestos, glass fibers and glass fiber fabric. The amount of the filler is generally 10–80 parts by weight, preferably 20–70 parts by weight per 100 parts by weight of the resin.

Figure 2:
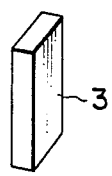
FIG. 2 is an enlarged perspective view of the structural member.

The shape of the structural member 3 is not specifically limited as long as it permits the insertion of the member 3 into the depressed portion 2. In the embodiment shown in FIGS. 1 and 2, the structural member 3 is a plate-like form which can plug the depressed portion 2.

Figure 3:
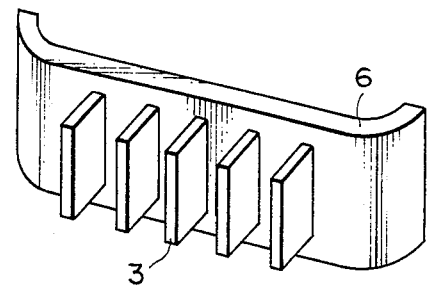
FIG. 3 is perspective view showing another embodiment of structural member of FIG. 1.

In another embodiment shown in FIG. 3, a plurality of the structural members 3 are mounted integrally in a comb-like fashion on a back beam 6 which serves as a rear mounting surface of the bumper assembly.

Figure 4:
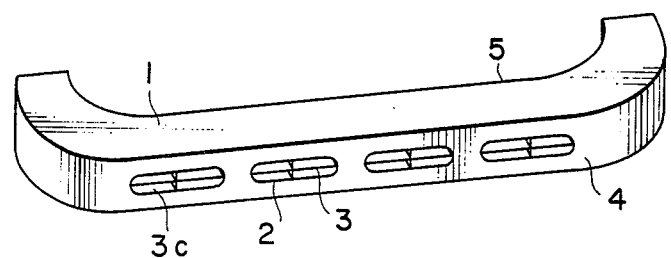
FIG. 4 is a perspective view showing another embodiment of atutomobile bumper core material according to the present invention.
Figure 5:
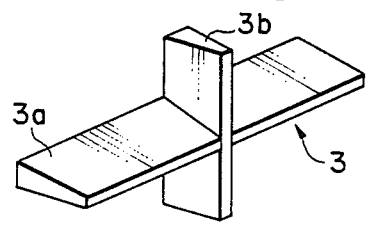
FIG. 5 is an enlarged perspective view of the structural member of FIG. 4.

FIGS. 4 and 5 depict a further embodiment, in which The structural member 3 is constructed from two, intersected, laterally and vertically extending walls 3a and 3b. The depressed portions 2 in this embodiment are provided in the front surface 4 of the elongated body 1 and are each in the form of a cavity within which the structural member 3 is disposed to define cells 3c therebetween. The structural member 3 may be in any other form such as a honeycomb structure, rod or plate.

The structural members 3 are used in a number so that the ratio of the total weight of the structural members 3 to the elongated foamed body 1 is in the range of 1/50 to 5/1, preferably 1/30 to 3/1, more preferably 1/20 to 2.5/1 for reasons of desirable energy absorbing property and lightness in weight of the bumper core assembly.

The bumper core assembly according to the present invention, in which the structural members 3 are disposed within a plurality of bores 2 of the elongated foamed body 1, has an improved energy absorbing efficiency in comparison with a bumper core formed of a single material with a higher density than the foamed body 1 and having the same weight as that of the bumper core assembly of this invention.

The following examples and comparative examples will further illustrate the present invention.

EXAMPLE 1

A foamed body, formed of an ethylene-propylene random copolymer (ethylene content: 2.5 weight %) and having a size of 10 cm×50 cm×7 cm and a bulk density of 0.06 g/cm$^3$ was prepared in a manner as disclosed in U.S. pat. No. 4,600,636. The foamed body was formed to provide seven (7) depressions, similar to those shown in FIG. 1, each having a size of 10 cm×0.3 cm×3.5 cm in the front surface (with an area of 10×50 cm$^2$) thereof. Thus, the foamed body has a projected area in the direction from the front surface to the rear surface of 500 cm$^2$, a total area of the openings of the depressions of 21 (=7×10×0.3) cm$^2$ and a weight of 206 g. Into each depression was inserted a plate-like structural member formed of a polypropylene and having a bulk density of 0.9 g/cm$^3$ to obtain a core material. The structural members each had a shape identical to the shape of the depression of the foamed body. The total weight of the structural members is thus 66 (=7×0.9×10×0.3×3.5) g. The core material has a total weight of 272 g and a weight ratio of the structural members to the foamed body of 0.32/1. The core material was then tested for its energy absorbing property. Thus, the core material was horizontally placed on a table with the front surface thereof being directed upward. A plate-like weight (1500 kg) was dropped on the core material at a speed of 5 mile/hr. and the load received by the rear side of the core material was measured. The load caused was 8.2 tons.

COMPARATIVE EXAMPLE 1

An ethylene-propylene random copolymer (ethylene content : 2.5 weight %) foamed body having the same size as that in Example 1 and a density of 0.078 g/cm$^3$ was prepared. The foamed body had no depressions. The weight of the foamed body is thus 273 g. The energy absorbing property of the foamed body was measured in the same manner as in Example 1 to reveal that the load caused was 10.0 tons.

EXAMPLE 2

Example 1 was repeated in the same manner as that of Example 1 except that the foamed body having a density of 0.078 g/cm$^3$ and the structural member having a density of 1.07 g/cm$^3$ were used. The structural member used contained 25% by weight of glass fiber fillers dispersed in the polypropylene matrix. Thus, the core material has a total weight of 346 g and a weight ratio of the structural members to the foamed body of 0.29/1. The core material was then tested for its energy absorbing property in the same manner as Example 1. The exerted load was 8.3 g/cm$^3$.

COMPARATIVE EXAMPLE 2

Comparative Example 1 was repeated in the same manner as described, except that the foamed body had a bulk density of 0.099 g/cm$^3$ was used. The weight of the foamed body is thus 347 g. The load caused was found to be 12 tons.

From the results shown above, it will be appreciated that the bumper core material according to the present invention exhibits superior energy absorbing property without being accompanied with undesirable too much increase in weight.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

We claim:

1. A core material for an automobile bumper, comprising:
   an elongated body formed of a foamed polyolefin resin and having front and rear surfaces, said body being provided with a plurality of depressed portions in the front and/or rear surfaces thereof; and
   structural members formed of a synthetic resin and having a bulk density of 0.2–3.5 g/cm$^3$, said structural members being disposed within at least part of said depressed portions.

2. A core material according to claim 1, wherein the area of the opening of each depressed portion is in the range of 0.5 to 200 cm$^2$.

3. A core material according to claim 1, wherein the total area of the openings of said depressed portions is in the range of 15 to 100% of the area of projection of said body in the direction from the front to rear surfaces thereof.

4. A core material according to claim 1, wherein said area of projection is in the range of 1.5 to 100 cm$^2$.

5. A core material according to claim 1, wherein each depressed poriton has a depth of 15 to 90% of the distance between the front and the rear surfaces.

6. A core material according to claim 1, wherein each of said structural members substantially completely fills the corresponding depressed portion.

7. A core material according to claim 1, wherein each of said structural members contains a filler dispersed in the matrix of said synthetic resin.

8. A core material according to claim 1, wherein each of said structural members includes intersected, laterally and vertically extending walls formed of the synthetic resin, so that there are defined cells between the inside wall of the depressions and said laterally and vertically extending walls.

9. A core material according to claim 1, wherein each of said structural members has a density of 0.2–1.5 g/cm$^3$.

10. A core material according to claim 1, wherein the ratio of the total weight of the structural members to the weight of the elongated body is in the range of 1/30 to 3/1.

11. A core material according to claim 1, wherein said structural members are integrally mounted on a support.

12. A core material according to claim 1, wherein each of said depressed portions extends from said front surface toward said rear surface or from said rear surface toward said front surface and wherein each of said structural members has a shape extending along its axis and is disposed within said depression so that the axis thereof is in parallel with the direction along which said depression extends.

* * * * *